(12) United States Patent
Novak (10) Patent No.: US 7,443,388 B1
(45) Date of Patent: *Oct. 28, 2008

(54) HOUSING FOR A COMPUTING DEVICE

(75) Inventor: Chris J. Novak, San Jose, CA (US)

(73) Assignee: Apple Inc., Cupertino, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 11/169,608

(22) Filed: Jun. 28, 2005

Related U.S. Application Data (60) Continuation of application No. 10/013,126, filed on Dec. 7, 2001, now Pat. No. 6,933,929, which is a division of application No. 09/426,408, filed on Oct. 25, 1999, now Pat. No. 6,357,887.

(60) Provisional application No. 60/134,084, filed on May 14, 1999.

(51) Int. Cl.
G09G 5/00 (2006.01)
(52) U.S. Cl. .................. 345/173; 345/76; 345/82; 345/84; 345/176
(58) Field of Classification Search .......... 345/76–85, 345/169, 173–178; 362/26, 85, 95, 253; 178/18.01–18.08
See application file for complete search history.

(56) References Cited

U.S. PATENT DOCUMENTS

| | | | |
|---|---|---|---|
| 3,777,222 A | 12/1973 | Harris |
| 4,277,665 A | 7/1981 | Kondo et al. |
| 4,789,774 A | 12/1988 | Koch et al. |
| 4,845,481 A | 7/1989 | Havel |
| 4,847,736 A | 7/1989 | Ho |
| 5,008,870 A | 4/1991 | Vessa |
| 5,138,328 A | 8/1992 | Zibrik et al. |
| 5,222,076 A | 6/1993 | Ng et al. |
| 5,228,562 A | 7/1993 | Burk |
| 5,305,013 A | 4/1994 | Daniels |
| D348,905 S | 7/1994 | Smid |
| 5,339,213 A | 8/1994 | O'Callaghan |
| 5,387,901 A | 2/1995 | Hardt |
| 5,388,357 A | 2/1995 | Malita |

(Continued)

FOREIGN PATENT DOCUMENTS

DE 10137919 8/2001

(Continued)

OTHER PUBLICATIONS

"iBook: How to Determine Battery Charge Status", Article ID 58417, Apple Care Tech Info Library, Aug. 25, 1999.

(Continued)

*Primary Examiner*—Vijay Shanakr
(74) *Attorney, Agent, or Firm*—Beyer Law Group LLP (57) ABSTRACT

Improved housing for a computing device is disclosed. The improved housing is provided with one of an illuminable connector, a touch pad arrangement, and a palm rest stiffening plate. Normally, the illuminable connector and the touch pad arrangement are provided on external portions of a housing of the computing device such that they are available for user interaction. The palm rest stiffening plate is provided internal to a housing to provide stiffness or rigidity to a palm rest region of the housing.

23 Claims, 6 Drawing Sheets

U.S. PATENT DOCUMENTS

| | | |
|---|---|---|
| 5,406,729 A | 4/1995 | Bejin |
| 5,422,751 A | 6/1995 | Lewis et al. |
| 5,450,221 A | 9/1995 | Owen et al. |
| 5,479,285 A | 12/1995 | Burke |
| 5,490,647 A | 2/1996 | Rice |
| 5,515,244 A | 5/1996 | Levins et al. |
| 5,615,945 A | 4/1997 | Tseng |
| 5,644,320 A | 7/1997 | Rossi |
| 5,666,261 A | 9/1997 | Aguilera |
| 5,668,565 A | 9/1997 | Robinson |
| 5,677,698 A | 10/1997 | Snowdon |
| 5,684,672 A | 11/1997 | Karidis et al. |
| 5,689,400 A | 11/1997 | Ohgami et al. |
| 5,706,168 A | 1/1998 | Erler et al. |
| 5,738,536 A | 4/1998 | Ohgami et al. |
| 5,742,120 A | 4/1998 | Lin |
| 5,748,084 A | 5/1998 | Isikoff |
| 5,774,098 A | 6/1998 | Kawashima et al. |
| 5,777,704 A | 7/1998 | Selker |
| 5,781,406 A | 7/1998 | Hunte |
| 5,825,351 A | 10/1998 | Tam |
| 5,828,341 A | 10/1998 | Delamater |
| 5,867,131 A | 2/1999 | Camp, Jr. et al. |
| 5,870,282 A | 2/1999 | Andre et al. |
| 5,914,709 A | 6/1999 | Graham et al. |
| 5,918,396 A | 7/1999 | Jung |
| 5,920,310 A | 7/1999 | Faggin et al. |
| 5,938,772 A | 8/1999 | Welch |
| 5,966,098 A | 10/1999 | Qi et al. |
| 5,966,284 A | 10/1999 | Youn et al. |
| 6,016,038 A | 1/2000 | Mueller et al. |
| 6,018,332 A | 1/2000 | Nason et al. |
| 6,030,088 A | 2/2000 | Scheinberg |
| 6,035,180 A | 3/2000 | Kubes et al. |
| 6,037,679 A | 3/2000 | Pirillo |
| 6,058,634 A | 5/2000 | McSpiritt |
| 6,061,037 A | 5/2000 | Brouwers et al. |
| 6,089,893 A | 7/2000 | Yu et al. |
| 6,096,984 A | 8/2000 | Howell et al. |
| 6,109,760 A | 8/2000 | Salatrik et al. |
| 6,115,762 A | 9/2000 | Bell et al. |
| 6,144,552 A | 11/2000 | Whitcher |
| 6,150,774 A | 11/2000 | Mueller et al. |
| 6,161,944 A | 12/2000 | Leman |
| 6,166,496 A | 12/2000 | Lys et al. |
| 6,190,017 B1 | 2/2001 | Lai |
| 6,211,626 B1 | 4/2001 | Lys et al. |
| 6,217,182 B1 | 4/2001 | Shepherd et al. |
| 6,224,244 B1 | 5/2001 | Burys |
| 6,259,417 B1 | 7/2001 | Kim et al. |
| 6,285,420 B1 | 9/2001 | Mizumo et al. |
| 6,289,466 B1 | 9/2001 | Bayramoglu |
| 6,292,901 B1 | 9/2001 | Lys et al. |
| 6,320,941 B1 | 11/2001 | Tyroler |
| 6,340,868 B1 | 1/2002 | Lys et al. |
| 6,357,887 B1 | 3/2002 | Novak |
| 6,370,376 B1 | 4/2002 | Sheath |
| D457,667 S | 5/2002 | Piepgras et al. |
| D457,669 S | 5/2002 | Piepgras et al. |
| D457,974 S | 5/2002 | Piepgras et al. |
| D458,395 S | 6/2002 | Piepgras et al. |
| D463,610 S | 9/2002 | Piepgras et al. |
| 6,459,919 B1 | 10/2002 | Lys et al. |
| 6,476,726 B1 | 11/2002 | Pederson |
| 6,486,873 B1 | 11/2002 | McDonough et al. |
| D468,035 S | 12/2002 | Blanc et al. |
| 6,492,908 B1 | 12/2002 | Cheng |
| 6,494,429 B2 | 12/2002 | Tajima |
| 6,494,593 B2 | 12/2002 | An et al. |
| 6,507,338 B1 * | 1/2003 | Liao et al. ............ 345/173 |
| 6,528,954 B1 | 3/2003 | Lys et al. |
| 6,548,967 B1 | 4/2003 | Dowling et al. |
| 6,577,080 B2 | 6/2003 | Lys et al. |
| 6,608,453 B2 | 8/2003 | Morgan et al. |
| 6,608,996 B1 | 8/2003 | Laurikka et al. |
| 6,624,597 B2 | 9/2003 | Dowling et al. |
| 6,652,128 B2 | 11/2003 | Misaras |
| 6,690,362 B1 | 2/2004 | Motoyama et al. |
| 6,720,745 B2 | 4/2004 | Lys et al. |
| 6,816,149 B1 | 11/2004 | Alsleben |
| 6,888,322 B2 | 5/2005 | Dowling et al. |
| 6,933,929 B1 * | 8/2005 | Novak .................. 345/173 |
| 6,977,808 B2 | 12/2005 | Lam et al. |
| 6,992,733 B1 | 1/2006 | Klein |
| 7,113,196 B2 | 9/2006 | Kerr |
| 7,148,875 B2 | 12/2006 | Rosenberg et al. |
| 7,239,503 B2 | 7/2007 | Chen |
| 2002/0113555 A1 | 8/2002 | Lys et al. |
| 2002/0190975 A1 | 12/2002 | Kerr |
| 2003/0002246 A1 | 1/2003 | Kerr |
| 2003/0161093 A1 | 8/2003 | Lam et al. |
| 2004/0141321 A1 | 7/2004 | Dowling et al. |
| 2004/0201573 A1 | 10/2004 | Yu et al. |
| 2005/0036300 A1 | 2/2005 | Dowling et al. |
| 2005/0047132 A1 | 3/2005 | Dowling et al. |

FOREIGN PATENT DOCUMENTS

| | | |
|---|---|---|
| EP | 0564127 | 10/1993 |
| JP | 10-105313 | 4/1998 |
| JP | 2001147739 | 5/2001 |
| WO | WO/28510 | 5/2000 |
| WO | WO/10847 | 2/2002 |
| WO | WO 02/103503 | 12/2002 |
| WO | WO 02/103504 | 12/2002 |

OTHER PUBLICATIONS

Mahn et al., "HP-PAC: A New Chassis and Housing Concept for Electronic Equipment", Aug. 1994, Hewlett-Packard Journal.

Circuit City advertisement for Philips Somba 13 stereo TV.

Outpost.com advertisement for "Blue Cold Cathode Tube Light", downloaded Jul. 25, 2003.

Website www.cksauce.com/products/lightorb.htm, "LightOrb" downloaded Jan. 28, 2002.

Website www.cksauce.com/products/lightwand.htm, "LightWand" downloaded Jan. 28, 2002.

Website www.cksauce.com/products/lightwasher.htm, "LightWasher" downloaded Jan. 28, 2002.

Website www.cksuace.com/products/minilightwand.htm, "MiniLightWand" downloaded Jan. 28, 2002.

Website www.cksauce.com/products/lightsprite.htm, "LightSprite" downloaded Jan. 28, 2002.

Website www.cksauce.com/products/lightsaucer.htm, "LightSaucer" downloaded Jan. 28, 2002.

Website www.jtech.com/products/guest_alert.htm, "GuestAlert Guest Paging Systems", downloaded Jan. 28, 2002.

Website www.colorkinetics.com/products/controllers/index.htm, "Controllers feel the power. it's Herculean", downloaded Apr. 17, 2001.

Website www.colorkinetics.com/products/lights/icolor/index.htm, "iColor Series iWant. iNeed.iHave to have", downloaded Apr. 17, 2001.

Website www.2.consumer.philips.com/global/b2c/ce/catalog/product.jhtml?divld=0&groupID=TV, downloaded Jan. 28, 2002.

Apple Computer iBook Hardware, General Topics, iBook Ports and Connectors, Figs. 1 & 2.

Office Action in corresponding U.S. Appl. No. 11/198,783 dated Aug. 17, 2007.

Office Action in corresponding U.S. Appl. No. 11/198,820 dated Sep. 17, 2007.

Search Report for PCT Application No. PCT/US2004/043479 dated Oct. 4, 2005.

Written Opinion for PCT Application No. PCT/US2004/043479 dated Oct. 4, 2005.

Written Opinion for corresponding PCT Application No. PCT/US02/18953 dated Jul. 28, 2005.
Examination Report in corresponding Australian Patent No. 2002315170 dated Aug. 28, 2006.
Office Action dated Nov. 30, 2007 in Chinese Patent Application No. 200480042692.0.
Office Action dated Jan. 28, 2008 for U.S. Appl. No. 11/198,783.
Office Action dated Jan. 28, 2008 for U.S. Appl. No. 10/075,964.
Office Action dated Sep. 12, 2007 in U.S. Appl. No. 11/486,272.
Office Action dated Dec. 12, 2007 in U.S. Appl. No. 10/773,897.
Office Action dated Dec. 19, 2007 in U.S. Appl. No. 11/198,817.
Office Action dated Aug. 23, 2007 in U.S. Appl. No. 10/075,964.

* cited by examiner

HOUSING FOR A COMPUTING DEVICE

CROSS-REFERENCE TO RELATED APPLICATION

This application is a continuation of U.S. patent application Ser. No. 10/013,126 filed Dec. 7, 2001, now U.S. Pat. No. 6,933,929 which is a divisional of U.S. patent application Ser. No. 09/426,408 filed Oct. 25, 1999, now U.S. Pat. No. 6,357,887, which claims priority to U.S. Provisional Application No. 60/134,084, filed on May 14, 1999, all of which are incorporated by reference herein.

BACKGROUND OF THE INVENTION

1. Field of the Invention

The present invention relates generally to computer system and, more particularly, to improved features for housings of computer systems.

2. Description of the Related Art

All computing devices, including portable computers and desktop computers, have housings that encloses the components and circuitry of the computing devices. These housings are known to include various ports (e.g., parallel port, serial port, audio port, PC-Card slot) at their periphery to allow external devices to electrically couple to the computing devices. Access to the various ports is normally provided by associated connectors or slots that are provided as the periphery of the housings. The external devices that electrically couple to these ports typically do so with plugs or cards that mate with the connectors or slots. One disadvantage with the conventional use of such connectors or slots is that they are not easily located. Another disadvantage is that it is often difficult for users to determine whether proper connections have been made upon inserting the mating plugs or cards into the connectors or slots.

Computing devices are also known to make use of a touch pad (or track pad) as an input device to the computing devices. With portable computers, a palm rest portion of the base housing for the portable computers is often provided with a touch pad. Conventionally, touch pads have been attached with a bracket structure to the inside surface of the base housing such that the touch pad is held in place from the inside of the base housing and made accessible through an opening in the palm rest.

Unfortunately, the conventional approaches to attaching the touch pad to the base housing lead to problems. One problem with conventional approaches is that assembly is difficult because the touch pad is assembled and held in place from the inside of the base housing (i.e., from the underside of the palm rest). Another problem with conventional approaches is that the touch pad is necessarily recessed below the top surface of the palm rest by the thickness of the base housing at the palm rest which tends to make its use by users more difficult.

Also, as base housings get thinner and lighter, the base housings unfortunately get more flexible and thus less stiff. This even more true with base housings that provide industrial design features into the base housings because non-rectangular structures often associated with modern industrial designs offer even less rigidity. While internal ridges have been used to increase strength, recent designs are not always amenable to providing for internal ribs. For example, when there is limited space inside the housing the ribs may not provide the desired stiffness. Furthermore, in some applications, particularly around sensitive parts such as a Compact Disk (CD) drive or Digital Versatile Disc (DVD) drive, the strength of the walls enclosing the CD/DVD drive need to substantially resist deflections to prevent damage to the CD/DVD drive. As an example, in some of today's portable computers, a deflection of more than ½ millimeter around the CD/DVD drive can damage the sensitive parts of the CD/DVD drive. The ability of housing to sufficiently resist such deflection is becoming increasingly difficult as base housing become thinner and provide industrial design features. As an example, in the case of a portable computer, one test that can be applied to test deflection is that a base housing must not deflect more than ½ millimeter when put under a 10 lb. force.

Thus, there is a need for improved housings for computing devices.

SUMMARY OF THE INVENTION

Broadly speaking, the invention relates to an improved housing for a computing device. A first aspect of the invention pertains to an illuminable connector suitable for use with the computing device. A second aspect of the invention pertains to a touch pad arrangement also suitable for use with the computing device. Both the illuminable connector and the touch pad arrangement can be provided on external portions of a housing of the computing device such that they are available for user interaction. A third aspect of the invention pertains to a palm rest stiffening plate.

The invention can be implemented in numerous ways, including as an apparatus, a device, a method, and a computer system. Several embodiments of the invention are discussed below.

As an illuminable connector for use with a computer having a light source, one embodiment of the invention includes a connector configured to transmit signals to and from the computer, and a light emitting enclosure having a light receiving area and an illuminating area. The light emitting enclosure is configured to direct light from the light source through said light emitting enclosure from the light receiving area to the illuminating area, and said light emitting enclosure is disposed around the outer periphery of said connector.

As a computer system, one embodiment of the invention includes a light source, a computer housing configured to enclose said light source, and an illuminable connector provided at an outer peripheral surface of said computer housing. The illuminable connector including a connector configured to transmit signals to and from said computer system, and a light emitting enclosure having a light receiving area and an illuminating area. The light emitting enclosure being configured to direct light from said light source through said light emitting enclosure from the light receiving area to the illuminating area, and said light emitting enclosure being disposed around the outer periphery of said connector.

As a method for illuminating a translucent connector that is connected to an outer peripheral surface of a computer housing, one embodiment of the invention includes the acts of: transmitting light from a light source enclosed in the computer housing; receiving the transmitted light at a light receiving portion of the translucent connector; directing the transmitted light from the light receiving portion of the translucent connector through the translucent connector to an outer periphery of the translucent connector such that light is directed outward away from the outer periphery of the computer housing.

As a touch pad apparatus, one embodiment of the invention includes: a housing having an outer surface and an opening through said housing, said housing further including a first recess within the outer surface about the opening to produce a first recessed surface; and a track pad said track pad being disposed in the first recess.

As a portable computer housing, one embodiment of the invention includes: a bottom portion providing a bottom surface for said portable computer housing; a top portion providing a top surface for said portable computer housing, said top surface having a palm rest region; and a stiffener affixed to an inner surface of the palm rest region of said top portion. The top portion and said bottom portion are coupled together to form said portable computer housing. The stiffener operates to provide stiffness to the palm rest region substantially beyond the stiffness otherwise provided by said top portion.

As a stiffening system for providing strength to a portable computer housing, one embodiment of the invention includes a computer housing and a stiffening plate. The computer housing including at least a top portion and a bottom portion. The top portion has an inner surface and an outer surface, and the top portion includes a palm rest region on the outer surface. The bottom portion is configured to be coupled to the top portion such that said top portion and said bottom portion when coupled together form said portable computer housing. The stiffening plate is configured to be coupled to the inner surface of said top portion of said computer housing and the stiffening plate is configured to strengthen said palm rest region.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The invention pertains to an improved housing for a computing device. More particularly, a first aspect of the invention pertains to an illuminable connector suitable for use with the computing device. A second aspect of the invention pertains to a touch pad arrangement also suitable for use with the computing device. Both the illuminable connector and the touch pad arrangement can be provided on external portions of a housing of the computing device such that they are available for user interaction. A third aspect of the invention pertains to a palm rest stiffening plate.

Embodiments of the invention are discussed below with reference to FIGS. 1-6. However, those skilled in the art will readily appreciate that the detailed description given herein with respect to these figures is for explanatory purposes as the invention extends beyond these limited embodiments.

Figure 1:
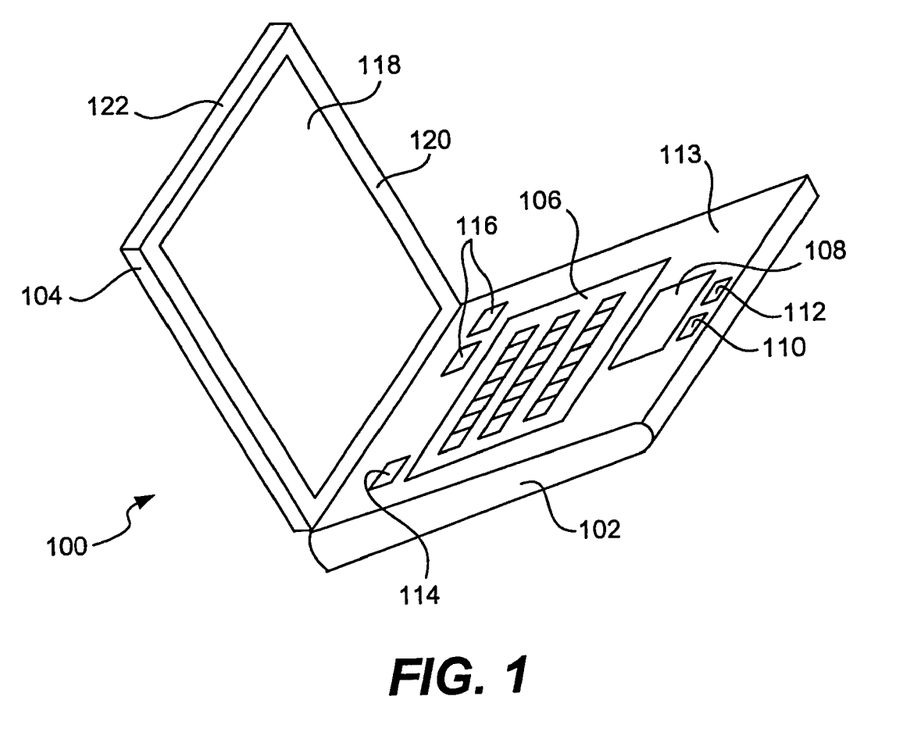
FIG. 1 is a perspective diagram of a portable computer.

FIG. 1 is a perspective diagram of a portable computer 100. The portable computer 100 includes a base 102 and a lid 104. The base 102 houses internally various integrated circuit chips and other circuitry to provide computing operations for the portable computer 100. The integrated circuit chips and other circuitry include a microprocessor, Read-Only Memory (ROM), Random-Access Memory (RAM), a disk drive, a battery, and various input/output (I/O) support circuitry. The base 102 also includes a keyboard 106 that allows a user of the portable computer 100 to enter alphanumeric data. The base 102 also includes a track pad 108 and associated buttons 110 and 112. The track pad 108 is an input device for the portable computer 100 and generally represents an input pointer device. The associated buttons 110 and 112 allow a user to make a selection with respect to a graphical user interface. The track pad 108 and the buttons 110 and 112 are located in an upper, front area of the base 102 referred to as a palm rest 113. Additionally, the base 102 includes a power switch 114 and miscellaneous switches 116.

The lid 104 is coupled to the base 102 by way of a hinge mechanism (not shown). As such, the lid 104 can rotate into an open position or a closed position with respect to the base 102. As illustrated in FIG. 1, the lid 104 is in the open position. The lid 104 contains a liquid crystal display (LCD) 118. The LCD display 118 is visible to a user of the portable computer 100 when the lid 104 is in the open position, such as illustrated in FIG. 1. The LCD display 118 is used to display the graphical user interface (including perhaps a pointer or cursor) as well as other information to the user. The LCD display 118 is surrounded at a peripheral region by a bezel 120 that serves to support the LCD display 118 in its assembled position within the lid 104. When the lid 104 is in a closed position, an outer surface 122 of the lid 104 is visible but the LCD display 118 and the bezel 120 are no longer visible to the user.

According to a first aspect of the invention, a connector with an illuminable enclosure is provided. In one embodiment, the illumination provided is used to show a computer user (operator) whether or not a connection is made between a plug and a socket that are operatively coupled together. For ease of discussion, the term "illuminable connector" herein refers to a connector that includes an illuminable enclosure.

Figure 2:
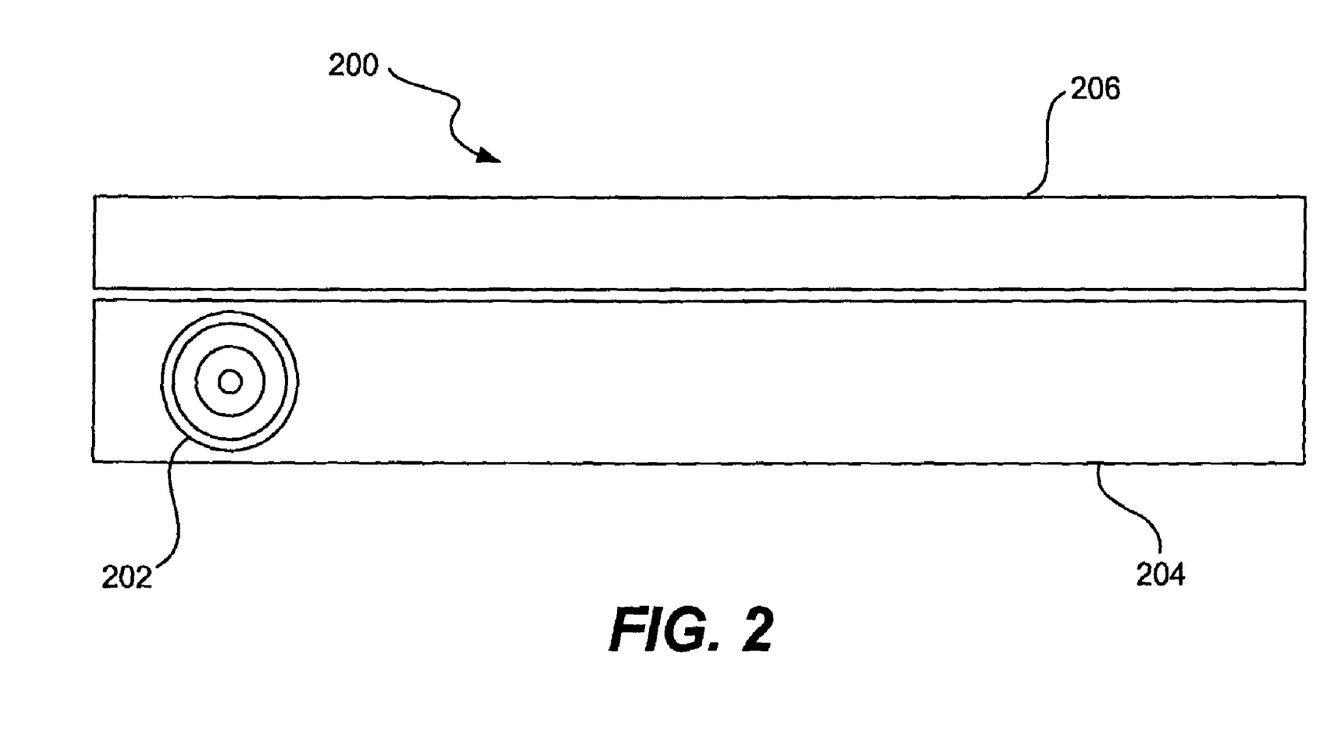
FIG. 2 illustrates an illuminable connector arranged on a portable computer.

In one embodiment of the invention, the illuminable connector is structurally coupled to a surface of a computer housing. FIG. 2 illustrates an illuminable connector 200 arranged on a portable computer 202. The portable computer 200 is, for example, a side view of the portable computer 100 illustrated in FIG. 1. The portable computer 200 includes a base 204 and a lid 206 which respectively correspond to the base 102 and the lid 104 illustrated in FIG. 1. The portable computer 200 is illustrated in the closed position in FIG. 2.

The illuminable connector 202 can be provided on any side of the portable computer 200. Typically, the illuminable connector 202 is coupled to a peripheral surface of the base 204 (or base housing). The base 204 is arranged to have an opening for the illuminable connector 202. The illuminable connector 202 is provided in the opening so that not only is the illuminable connector 202 accessible for the purpose of inserting or removing a plug with respect to the illuminable connector 202 but also any illumination provided at the illuminable connector 202 can be seen by a computer operator.

In one embodiment, the illuminable connector 202 includes a socket (e.g., female) end of a connection that is structurally coupled to a peripheral surface of a computer housing. The illuminable connector 202 is made in part with a light guiding material that directs light from a light source internal to the computer housing to outside the computer housing. In a first embodiment, when a plug is operatively coupled to the socket, the light source is turned on so as to illuminate the illuminable connector 202. With the first embodiment, the light source is off when the plug is not operatively coupled to the socket (i.e., no illumination). In a second embodiment, when the plug is operatively coupled to the socket, the light source is turned off and when the plug is not operatively coupled to the socket the light source is on. Both the first and second embodiments can thus advantageously display, to a computer operator, whether or not a proper connection has been made between the plug and the socket. Namely, the presence or absence of light is able to be associated with connection or no connection.

Figure 3:
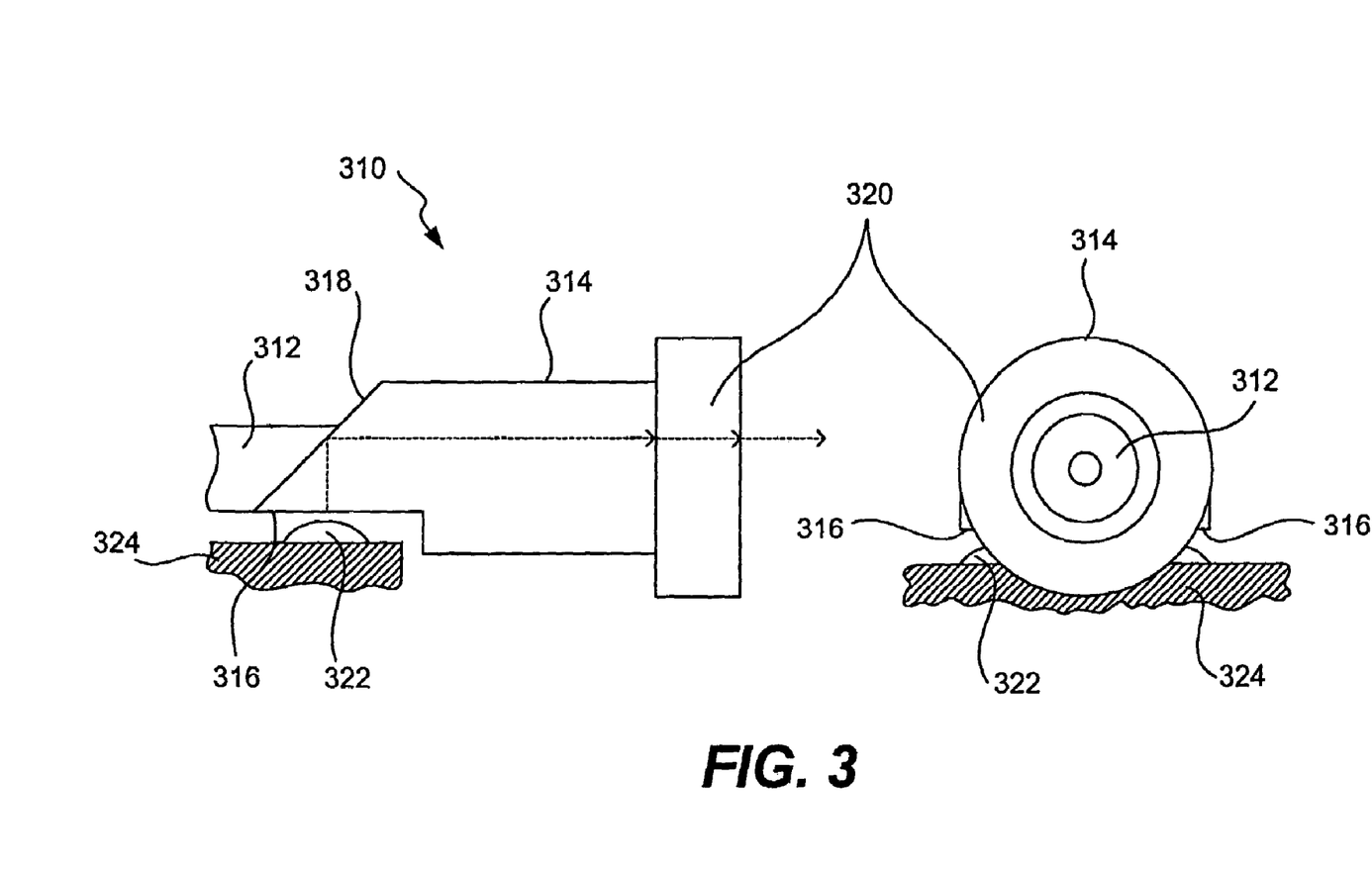
FIG. 3 depicts a side and front view of an illuminable connector according to one embodiment of the invention.

FIG. 3 depicts a side and front view of an illuminable connector 310 according to one embodiment of the invention. The illuminable connector 310 has a connector 312 and a light emitting enclosure 314. The connector 312 is configured to transmit electrical signals to and from a computer. For example, the connector 312 may provide an audio/visual connection, a telephony connection, a serial connection (e.g., Universal Serial Bus), or a parallel connection. However, it should be noted that the connector 312 is not limited by these types of connections and that any connection that uses a connector for electrical transmitting signals to and from a computer may be used. Typically, the connections are provided by a plug connector (e.g., male) and a socket connector (e.g., female) that operatively couple an external device to a computer. As an example, the external device can be a peripheral device. In the embodiment shown in FIG. 3, the connector 312 is a socket connector. In other embodiment, it may be desirable to make the connector 12 a plug connector.

The light emitting enclosure 314 is configured to be disposed around the outer periphery of the connector 312. That is, the light emitting enclosure 314 has an inner peripheral shape that coincides with at least a portion of an external peripheral shape of the connector 312. The outer peripheral shape of light emitting enclosure 314 can be configured in a wide range of shapes, including circle, square, rectangle, triangle, polygon, or logos. In other words, the light emitting enclosure 314 can take any shape that substantially surrounds the connector 312. The light emitting enclosure 314 may be structurally coupled to the connector 312 or may include an opening that allows connector 312 to be fitted therein. Also, the light emitting enclosure 314 may be configured to contact at least a portion of a surface of the connector 12 or may include a gap therebetween. Although FIG. 3 shows only one configuration (i.e., circular) for the connector 312 and the light emitting enclosure 314, it should be noted that this is not a limitation on the invention and that any configuration, depending on the type of connector used and the desired outer peripheral shape of the enclosure, can be used.

Furthermore, the light emitting enclosure 314 includes a light receiving area 316, a light directing area 318, and an illuminating area 320. The light receiving area 316 is configured to transmit light from a light source 322 to the light directing area 318. In most situations, the light receiving area 316 is formed to substantially adjacent to the light source 22 to efficiently couple light from the light source 322 to the light receiving area 316. Additionally, the light directing area 318 is arranged to direct the transmitted light from the light receiving area 316 to the illuminating area 320. In this manner, when the light source 322 is transmitting light, the transmitted light illuminates an illuminating area 320. By way of example, the light directing area 318 may be a reflecting surface of the light emitting enclosure 14 that reflects the transmitted light from light receiving area 316 towards the illuminating area 320. The dimensions and orientation of the reflecting surface are arranged such that the reflected light is transmitted to the illuminating area 320. Moreover, the reflecting surface may be disposed internal or external to the light emitting enclosure 314. However, it should be noted that the light directing area 318 may not be needed and that the light from the light source may be transmitted directly from the light receiving area 316 to the illuminating area 320.

Additionally, the illuminating area 320 is configured to transmit the directed light outward away from the illuminable connector 310 so as to illuminate the light emitting enclosure 314 when the light source 322 is turned on. Basically, the illuminating area 320 is a surface on the light emitting enclosure 314 that is luminous when the light source 322 is turned on. In most instances, the illuminating area 320 is at least partially located on the distal face of the light emitting enclosure 314. However, the illuminating area 320 is not limited to the distal face (i.e., front portion) and may be any surface of the illuminable enclosure including side and top portions. The distal face of the light emitting enclosure 314 may be planar or non-planar. Additionally, the distal face of the light emitting enclosure 314 may also be recessed, flush or extend out relative to the distal face of the connector 312.

The material that forms the illuminable enclosure must be suitable to facilitate the transmission of light therethrough. Accordingly, the material must exhibit suitable translucent characteristics for proper operation. It may be advantageous if the material is easily formable to different types of shapes including both simple and complex geometries. Additionally, the material could also be determined with reference to the environment it will be used in, such as impact strength and temperature. In some implementations, such materials are easily formed by certain types of plastics or other translucent materials. In one embodiment, the material can be composed of polycarbonate, although other suitable materials may be used as well.

As noted above, the illuminable connector 310 is often structurally coupled to a peripheral surface of a computer housing. For example, the portable computer 200 (namely, base 204) may have an opening that is configured to hold the illuminable connector 310 on the inside peripheral surface of the base 204 and to provide illumination viewing space for the illuminating area 320 of the illuminable connector 310. Additionally, the distal face of the light emitting enclosure 314 may be recessed, flush or extend outward relative to the outer peripheral surface of the base 204. Also, the illuminable connector 310 is normally positioned on a front, back or side surface of the base 204, but can also be positioned on a surface of the lid 206.

The base 204 of the portable computer 200 is normally configured to enclose the light source 322 (see FIG. 3)) and other components (e.g., hardware circuitry) associated with a computer. In one embodiment the light source 322 is a light emitting diode. In one implementation, the light source 322 is affixed to a printed circuit board 324 that is provided within the base 204 as part of the components (e.g., hardware circuitry). Here, the illuminable connector 310 is also affixed relative to the printed circuit board (and thus the light source 322). However, various other types of light sources that can fit inside a computer housing can be used. Further, although the illuminable connector 310 can use a single light source, more than one light source can also be used. For example, the illuminable connector 310 can used a pair of light receiving areas 316 and a corresponding pair of light sources (one disposed on each side).

The illumination of the illumination area 320 can signal a computer operator (or user) whether or not a proper connection is made with the illuminable connector 320. More particularly, when an operative connection is made between the socket (or plug) of the illuminable connector 320 and an external plug (or socket), light is transmitted by the light source, thereby illuminating the illumination area 320 external to the computer housing such that the computer operator is visually notified that a proper connection was made. Here, the light source 322 is activated once the circuitry within the portable computer 200 determines that an external plug (or socket) has been properly connected.

Alternatively, the light source may be configured to be on when a connection is not made and off when a connection is made. Advantageously, in dark situations, a computer operator would be able to see the illuminable connector and make the proper connection with an external plug or socket.

The advantages of the first aspect of the invention are numerous. Different embodiments or implementations may have one or more of the following advantages. One advantage of the invention is that illumination of the connector provides information not only as to location of the connector but also whether or not a proper connection is made. Another advantage of the invention is that the light used to provide the illumination is provided internal to a computer housing and directed towards an illumination area of the connector located at the periphery of the computer housing. Still another advantage of the invention is that the illumination area of the connector can be formed into various different shapes or configurations for design considerations.

According to a second aspect of the invention, a touch pad arrangement for a computer is provided. In one embodiment, the touch pad is arranged with a palm rest of a computer system.

A touch pad, sometimes referred to as "a pressure sensitive tablet" or a "track pad", is an input device that typically is configured to move a pointer (or cursor) on a display screen (e.g., LCD display 118). The movement of an object, such as a finger or stylus, across the touch pad causes the pointer to move in a similar direction on the screen. Although touch pads can be provided in different apparatus, typically touch pads are provided on portable computers. For example, the computer system 100 illustrated in FIG. 1 includes the touch pad 108 and the associated buttons 110 and 112 at the palm rest 113.

Conventionally, a base housing for the portable computer is provided with an opening in the palm rest to provide access to a touch pad. A user (with finger to stylus) is able to use the touch pad through the opening in the palm rest. The touch pad is typically attached with a bracket structure to the inside surface of the base housing such that the touch pad is held in place and accessible through the opening in the palm rest. Unfortunately, the conventional approaches to attaching the touch pad to the base housing lead to problems. One problem with conventional approaches is that assembly is difficult because the touch pad is assembled and held in place from the inside of the base housing (i.e., from the underside of the palm rest). Another problem with conventional approaches is that the touch pad is necessarily recessed below the top surface of the palm rest by the thickness of the base housing at the palm rest which tends to be bothersome for users.

The touch pad arrangement for a computer according to the second aspect of the invention overcomes these problems with the conventional approaches. According to the invention, the touch pad arrangement provides for simplified assembly. The assembly of the touch pad to the palm rest is from the outside. The base housing is provided with a multi-recessed opening in the palm rest to receive the touch pad as well as a protective label that is placed over the touch pad. Additionally, once assembled, the touch pad is substantially flush with the outer surface of the base housing, thereby providing better ease of use.

Figure 4A:
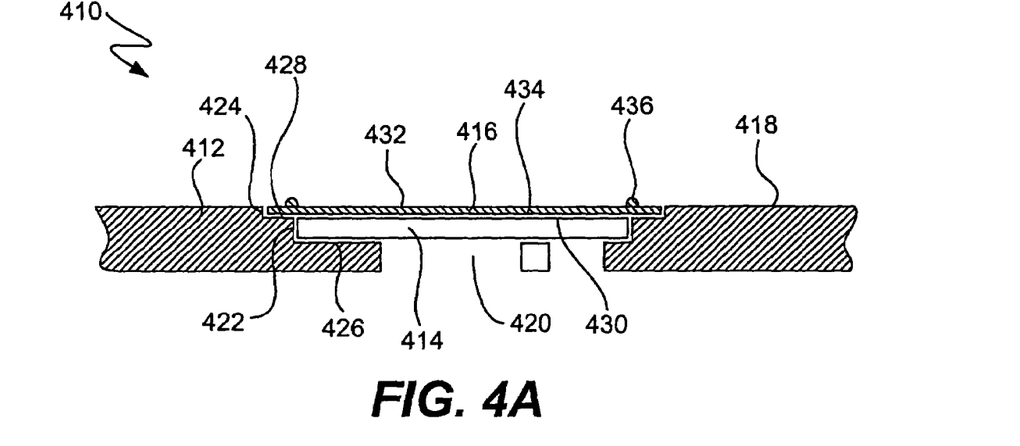
FIGS. 4A and 4B are diagrams of a side view and a perspective view of a touch pad system according to one embodiment of the invention.
Figure 4B:
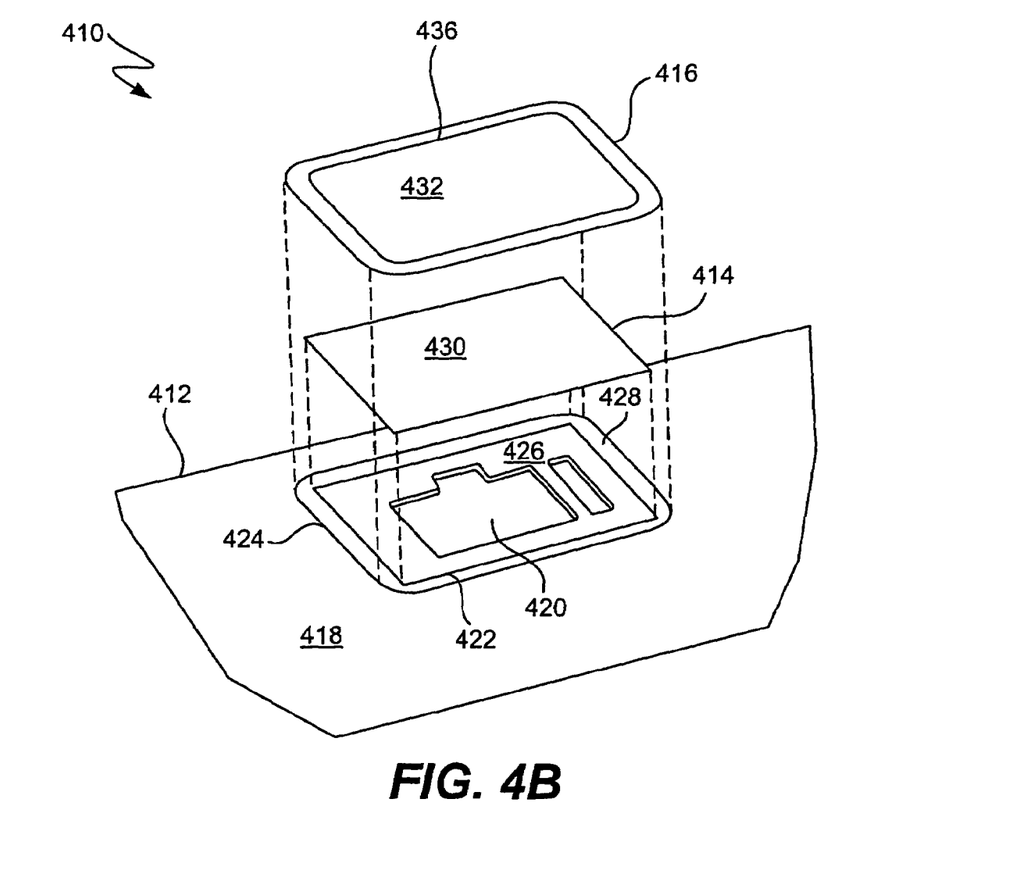

FIGS. 4A and 4B are diagrams of a side view and a perspective view of a touch pad system 410 according to one embodiment of the invention. The touch pad system 410 (not drawn to scale for ease of discussion) includes a track pad housing 412, a track pad 414 and a track pad label 416. Typically, track pad housing 412 is part of a computer housing (e.g., base housing or palm rest). However, it should be noted that the track pad housing 412 could be associated with other apparatuses besides a computer housing.

The track pad housing 412 has an outer surface 418 that includes an opening 420. As shown in FIG. 4B, the opening extends through the outer surface 418 to allow for wiring (not shown) of the track pad 414 to be provided internal to the computer housing. The track pad housing 412 also has a first recess 422 and a second recess 424 provided about the opening 420. The first recess 422 has a first recessed surface 426, and the second recess 424 has a second recessed surface 428. The first recess 422 is configured to coincide with the shape of the track pad 414 such that the track pad 414 will fit in the first recess 422 and against the first recessed surface 416. The second recess 424 is configured to coincide with the shape of the track pad label 416. The circumference of the second recess 424 is greater than the circumference of the first recess 422. When assembled, the track pad label 416 fits within the second recess 424 and over the track pad 414. In one embodiment, the depth of the first recess 422 is substantially the same as the thickness of the track pad 414, and the depth of the second recess 424 is substantially the same as the thickness of the track pad label 416.

The track pad 414 includes an input surface 30 that is configured to receive user inputs (e.g., top surface of the track pad). The track pad 414 can detect the user inputs in a variety of ways including pressure and capacitance. The track pad label 416 serves to protect the track pad 414 from foreign matter (e.g., fluids, dust, etc.) by sealing against the outer surface 418 in at least the second recessed surface. Preferably, the track pad label 416 is used to protect the input surface 430 of the track pad 414. Correspondingly, the track pad label 416 includes a contact surface 432 and an adhesive surface 434. The adhesive surface 434 is used to couple the track pad label 416 to the track pad 414 and the second recessed surface 428.

During assembly, the track pad 414 is disposed inside the first recess 422 and adjacent to the first recessed surface 426. In one embodiment, the input surface 430 of the track pad 414 is substantially flush with the second recessed surface 428 when the track pad 414 is disposed inside the first recess 422 and adjacent to the first recessed surface 426. Additionally, after the track pad 414 is placed, the track pad label 416 is disposed inside the second recess 424 and over to the track pad 414 and the second recessed surface 428 such that the adhesive surface 434 substantially covers the track pad and the second surface. The entire adhesive surface 434 need not have adhesive thereon, only the peripheral portion need contain adhesive. Once the track pad label 416 is placed, the contact surface 432 of the track pad label 416 is substantially flush with the outer surface 418 of the track pad housing 412.

Moreover, the contact surface 432 of the track pad label 416 can optionally include a ridge that surrounds the perimeter of the track pad 414. In one embodiment, the ridge can serve as a boundary to the input area for the touch pad system 410. When the combination of the track pad 414 and the track pad label 416 are flush with the track pad housing 418, the ridge serves to provide a user of the track pad system 410 with context as to where the boundaries are for the input area where the touch pad system 410 is active. FIGS. 4A and 4B illustrate the track pad label 416 with a ridge 436 according to one embodiment of the invention. The ridge 436 extends in a direction outward from the contact surface 432. The ridge 436 should be dimensioned to be large enough for finger or stylus sensitivity. In one implementation, the ridge 436 coincides above the outer perimeter of the track pad 414.

The advantages of the second aspect of the invention are numerous. Different embodiments or implementations may have one or more of the following advantages. One advantage of the invention is that assembly of a track pad (touch pad) into a housing, such as the base housing of a portable computer, is greatly simplified. Another advantage of the invention is that a track pad (touch pad) is able to be mounted flush with an outer surface of its housing, namely flush with a palm rest surface of a base housing of a portable computer.

A third aspect of the invention pertains to a stiffening plate (stiffener plate) for a housing associated with a computer. The invention is particularly suitable for a palm rest stiffening plate for use with a palm rest of a portable computer. For example, the portable computer 100 illustrated in FIG. 1 includes the palm rest 113 positioned on an upper, front area of the base 102. Furthermore, the stiffening plate may be configured to provide stiffness around other weak points of the computer housing. For example, the stiffening plate may be used to stiffen the weak sections of the computer housing around the CD/DVD drive and keyboard, where the housing has limited structure and support.

The stiffening plate is configured to increase the strength of the housing, which advantageously allows the thickness of the computer housing walls to be decreased. In most instances, decreased wall thickness reduces the overall thickness and weight of the computer, both of which are desired to make a portable computer lighter and thinner.

Figure 5A:
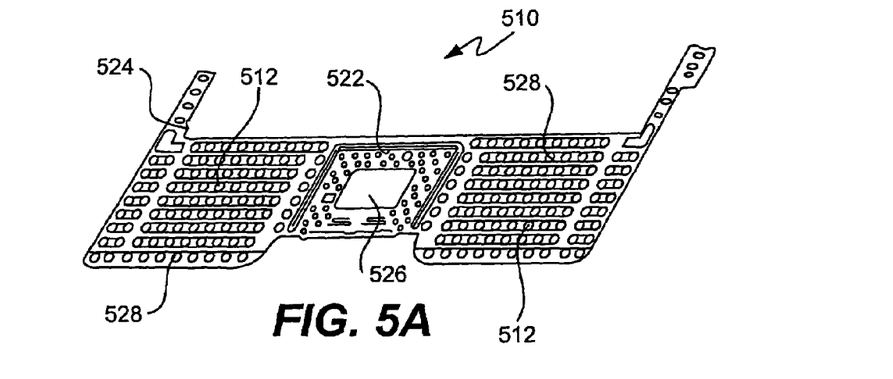
FIGS. 5A and 5B illustrate a stiffening plate according to one embodiment of the invention.

FIG. 5A illustrates a stiffening plate 510 according to one embodiment of the invention. The stiffening plate 510 is formed from a material having rigid strength and lightweight properties. In one embodiment, the stiffening plate 510 is stamped and formed from an aluminum sheet. In a preferred embodiment, the stiffening plate is formed from a 5052 series aluminum sheet having a 0.5 mm thickness. Although the stiffening plate is preferably made from aluminum, it should be noted that any material that is substantially rigid (e.g., providing stiffness), while being lightweight and relatively thin may be used.

Figure 5B:
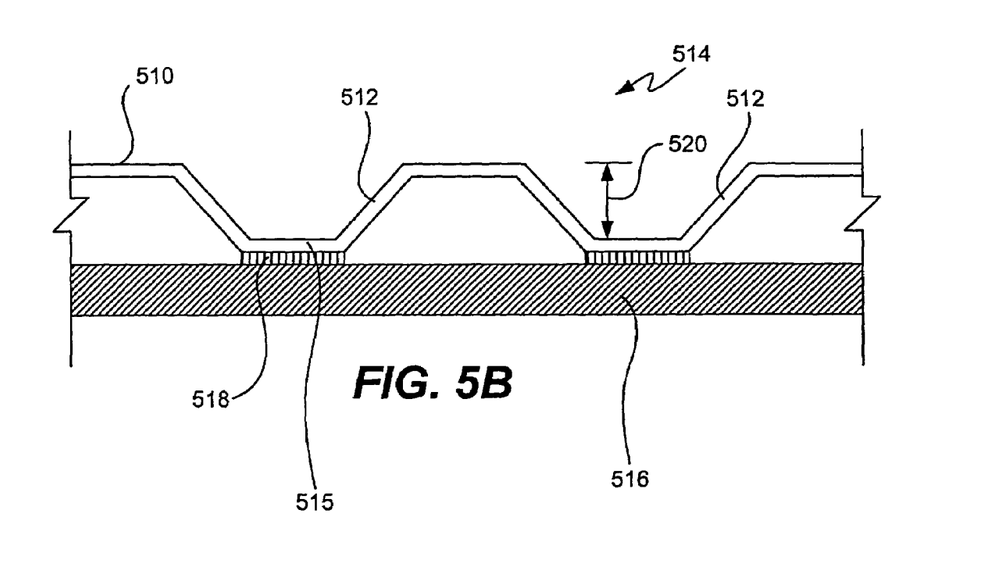

The stiffening plate 510 also includes a plurality of dimples 512 that serve to increase the stiffness (i.e., shear strength) of the stiffening plate 510 when adhered to an adjacent surface such as a computer housing. Preferably, the dimples when adhered to an adjacent surface create a box like structure at each of the dimple positions. That is, the dimples and the surface form a corrugated laminate structure, which provides a stiff structure having good shearing strength. Referring to FIG. 5B, an example of a dimple box structure 514 is shown. The dimple box structure 514 includes stiffening plate 510 having dimples 512. Preferably, dimples 510 provide flat surfaces 515 that are coupled to a surface 516 with an adhesive 518. For the most part, each dimple 512 represents a glue joint for adhering the stiffening plate 510 to a surface 516. Advantageously, when the combination of the stiffening plate 510, surface 516 and adhesive 518 is bonded together, a plurality of joined boxes (e.g., honeycomb) are created which yield the desired shear strength. For example, such a structure can enable a thin, lightweight housing to withstand deflection of more than ½ millimeter when put under a 10 lb. force.

Furthermore, the plurality of dimples 512 have a dimple depth 520. As is well known in the art, the greater the depth of the dimple, the greater the stiffness of the structure. However, the dimple depth is generally constrained by the overall thickness of the computer and the adjacent internal structures. For that reason, the dimples are preferably configured to be shallow so as not to impact the overall thickness of the stiffening plate 510. In one embodiment, the dimple depth is about 0.8 mm. Correspondingly, the overall height of the stiffening plate is about 1.3 mm.

Referring back to FIG. 5A, the dimples 512 are patterned to maximize the strength of the stiffening plate 510. Additionally, it should be noted that the dimples 512 are not a limitation and that other manufacturing process that increases the strength of the stiffening plate may be used. For example, a stamped protrusion 522 may also be used in conjunction with the dimples to form the corrugated like structure. Furthermore, a formed edge 524 at the perimeter of the stiffening plate may also be used to increase the stiffness of the stiffening plate.

The stiffening plate 510 is also configured to provide openings 526 for features such as connectors, wires and other computer components (e.g., track pad, buttons). Furthermore, stiffening plate 510 may include holes 528 for reducing the overall weight of the stiffening plate 510. Additionally, the stiffening plate 510 may include protrusions and/or depressions that coincide with the housing shape. Also, as is appreciated by those skilled in the art, Aluminum can be easily formed (e.g., coining or stamping), and therefore many design features may be configured into the stiffening plate.

By way of example, the computer housing may be the base 102 of a portable computer 100 as shown in FIG. 1). In most situations, a base housing (or base) includes the top portion and a bottom portion. Typically, the bottom portion is configured to be coupled to the top portion such that when the top portion and the bottom portion are coupled together they form the base of the portable computer.

Figure 6:
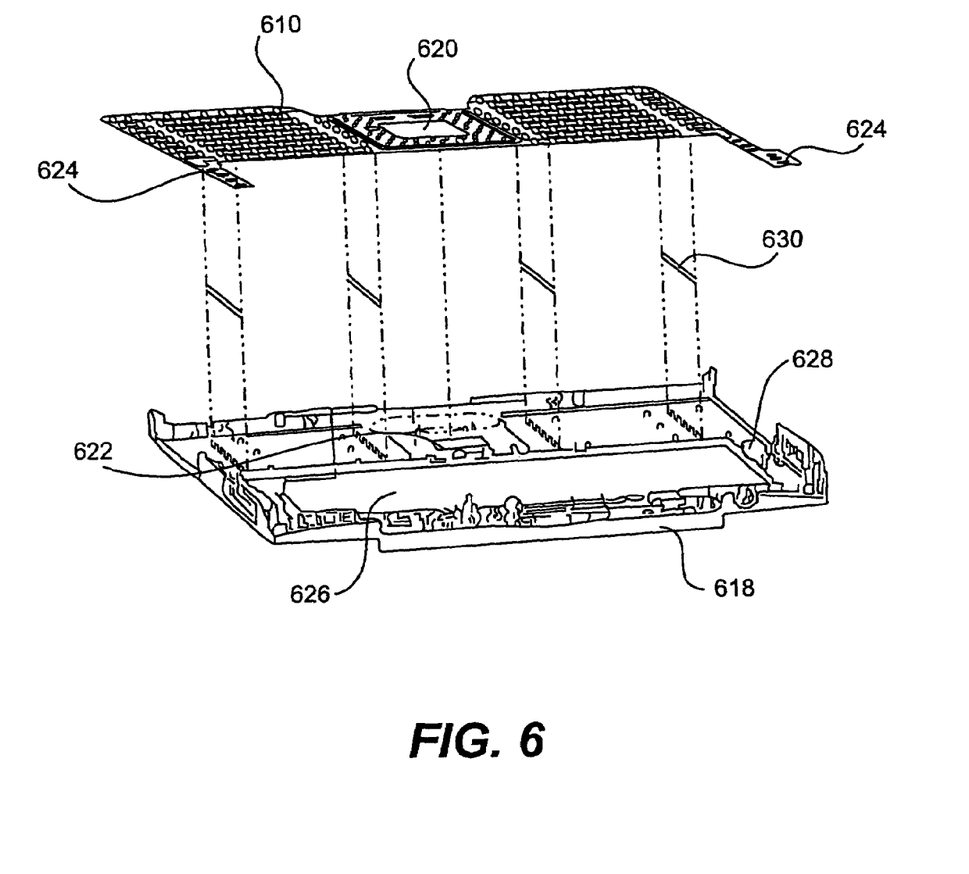
FIG. 6 is a diagram of a portion of a top portion of a base housing for use with a computer system.

FIG. 6 is a diagram of a portion of a top portion 618 of a base housing for use with a computer system. An outer surface of the top portion 618 of the housing has a palm rest (e.g., palm rest 113 of FIG. 1). The palm rest provides a space for resting the palms of the portable computer user while the user types or uses a track pad on the portable computer. Because the palm rest is load bearing (e.g., weight of the user's palms) it is required to be strong (e.g., to prevent bowing or unduly flexing). To be able to support such a load, the inner surface of the top portion 618 includes a stiffening plate 610. The stiffening plate 610 can, for example, be the stiffening plate 510 illustrated in FIGS. 5A and 5B. More particularly, the stiffening plate 610 is affixed against the inner surface of the top portion 618 of the computer housing. In one implementation, the stiffening plate 610 has a shape that is configured to coincide with the at least a portion of the shape of the palm rest. Correspondingly, the laminate structure of the top portion and the stiffening plate 610 preferably provides the required strength for supporting the palm rest. It should be noted that the stiffening plate 610 is not limited to only stiffening the palm rest region of a housing and that it may be used to stiffen other portions of a computer housing as well.

Moreover, the stiffening plate 610 is affixed to the inner surface of the top portion 618 with an adhesive (not shown). Namely, in one embodiment, adhesive can be placed at each dimple and thus serves to bond the dimples to a mating region of the inner surface of the top portion 618 (see FIG. 5B). In one implementation, the adhesive is a two part epoxy that bonds well between the material of the stiffening plate and the material of the top portion. Characteristically, this material provides good shear strength when combine with these two materials. In one embodiment, the stiffening plate is formed from aluminum and the top portion is formed from plastic (e.g., polycarbonate ABS). In some implementations, the top portion is nickel plated plastic. Preferably, in this implementation, the two part epoxy is a Lord 201 adhesive made by Lord Corp. of Erie, Pa. It should be noted that other types of adhesives can be used so long as they form a laminate bond with good shear strength between the stiffener and the top portion.

Additionally, it should be noted that other fastening means may be used (e.g. screws, bolts, heat staked) to couple the stiffening plate to the top portion, but none will produce the strength provided by the permanent laminate structure that uses an adhesive as described above. In fact, in one embodiment, heat stakes are used to properly align the stiffening plate on the top portion during manufacturing. Typically, screws and bolts have too much weight and over time may come loose. Additionally, heat stakes overtime will become stressed and possibly break wherein the stiffening plate may come loose or may break off.

The stiffening plate 610 can also include a first plate opening 620 and the top portion 618 can include a first top portion opening 622. Both the first plate opening 620 and the first top portion opening 622 are dimensioned to fit around a portion of a track pad (not shown). In most situations, the first top portion opening 620 provides an opening for a track pad provided in the palm rest of the top portion 618. Furthermore, the stiffening plate includes a recess (not shown) that provides a mounting surface for the track pad. In this configuration, the recess traps and holds the track pad in position between the stiffening plate and the top portion 618.

Moreover, the stiffening plate 610 includes extensions 624 and the top portion 618 includes a second top portion opening 626. The second top portion opening 626 is dimensioned to fit around (i.e., not interfere with) a portion of a set of keys of a keyboard. Correspondingly, the extensions 624 are configured to surround a portion of the second top portion opening 626. In this manner, the extensions increase the stiffness at a potential weak area 628 between the location of the key pad and the CD/DVD drive opening in the top portion 618.

Additionally, the configuration and placement of the stiffening plate may cause the stiffening plate to act like an antenna. Therefore, the conductive stiffening plate should be grounded. In one embodiment, to provide grounding, at least one EMI (electromagnetic interference) gasket 630 is disposed between the top portion 618 and the stiffening plate 610 to ground the stiffening plate 610 to the top portion 618. It should be noted that more than one EMI gasket may be needed to provide adequate grounding, and therefore the present invention is not limited by one EMI gasket and that a plurality of EMI gaskets may be used. In one case, the EMI gaskets 630 is a strip of foam surrounded by a conductive material. In this manner, the foam provides a spring-like surface that ensures contact between the stiffening plate and the top portion which itself has a conductive inner coating (e.g., nickel plated plastic).

Accordingly, the third aspect of the invention provides significant improvements to the structure, ruggedness and strength of the base housing (e.g., palm rest portion) of a computer. Furthermore, through use of a stiffening plate, the palm rest portion is able to be thin, but extremely stiff, and thus the housing as whole can have a reduced in thickness. The stiffening the palm rest is also achieved with a relatively small amount of additional weight. Additionally, the stiffening plate creates such a stiff structure that the materials that form the internal housings for parts such as the enclosure for the CD/DVD drive could be changed to less rigid and thus less weighted materials. Basically, the stiffer housing makes it possible to have a less stiff structure around the CD/DVD drive to support it. For example, the CD/DVD support could be changed from steel to aluminum. Therefore, the third aspect invention supports the further reduction in thickness and weight for portable computers.

Although the invention is particularly well suited for use in a computer system, namely a portable computer system, the invention is not limited to use in computer systems. The invention is suitable for other devices or apparatuses that include a touch pad or track pad.

The advantages of the second aspect of the invention are numerous. Different embodiments or implementations may have one or more of the following advantages. One advantage of the invention is that assembly is simplified which reduces manufacturing costs associated with labor and parts. Another advantage of the invention is that the flush design improves user satisfaction.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computing device, comprising:
a housing that encloses internally various electronic components that provide computing operations to the computing device;
a pair of light emitting diodes disposed inside the housing and configured to illuminate an outer surface of the housing; and
a translucent region provided at the outer surface of the housing, the translucent region including a light receiving area and an illumination area, the translucent portion being configured to direct light from the pair of light emitting diodes through the translucent portion from the light receiving area to the illuminating area, the illuminating area forming a surface portion of the outer surface of the housing that is luminous when the pair of light emitting diodes are providing light internal to the housing.

2. The computing device as recited in claim 1 wherein the light receiving area is substantially adjacent to the pair of light emitting diodes to efficiently couple light from the light emitting diodes to the light receiving area.

3. The computing device as recited in claim 1 further including a light directing area arranged to direct the transmitted light from the light receiving area to the illuminating area.

4. The computing device as recited in claim 1 wherein the light directing area includes a reflecting surface that reflects the transmitted light from the light receiving area towards the illuminating area.

5. The computing device as recited in claim 1 wherein the reflecting surface is disposed internal to the translucent portion.

6. The computing device as recited in claim 1 wherein the reflecting surface is disposed external to the translucent portion.

7. The computing device as recited in claim 1 wherein the surface portion is planar.

8. The computing device as recited in claim 1 wherein the surface portion is non-planar.

9. The computing device as recited in claim 1 wherein the pair of light emitting diodes are affixed to a printed circuit board that is provided within the housing.

10. A method for illuminating a computer housing, comprising:
   transmitting light from a pair of light emitting diodes enclosed in the computer housing;
   receiving the transmitted light at a light receiving portion of the computer housing;
   directing the transmitted light from the light receiving portion of the computer housing to the outer periphery of the computer housing such that light is made to illuminate the computer housing.

11. The method as recited in claim 10 wherein the light receiving portion is substantially adjacent to the pair of light emitting diodes to efficiently couple light from the light emitting diodes to the light receiving portion.

12. The method as recited in claim 11 wherein the computer housing further includes a light directing area, the method further comprising
   directing the transmitted light from the light receiving area to the illuminating area by the light directing area.

13. The method as recited in claim 12 wherein the light directing area includes a reflecting surface, the method further comprising:
   reflecting the transmitted light from the light receiving area towards the illuminating area by the reflecting surface.

14. The method as recited in claim 13 wherein the reflecting surface is disposed internal to the translucent portion.

15. The method as recited in claim 13 wherein the reflecting surface is disposed external to the translucent portion.

16. The method as recited in claim 10 wherein the pair of light emitting diodes are affixed to a printed circuit board that is provided within the housing.

17. Computer program product for illuminating a computer housing, comprising:
   computer code for transmitting light from a pair of light emitting diodes enclosed in the computer housing;
   computer code for receiving the transmitted light at a light receiving portion of the computer housing;
   computer code for directing the transmitted light from the light receiving portion of the computer housing to the outer periphery of the computer housing such that light is made to illuminate the computer housing; and
   computer readable medium for storing the computer code.

18. Computer program product as recited in claim 17 wherein the light receiving portion is substantially adjacent to the pair of light emitting diodes to efficiently couple light from the light emitting diodes to the light receiving portion.

19. Computer program product as recited in claim 11 wherein the computer housing further includes a light directing area, the computer program product further comprising
   computer code for directing the transmitted light from the light receiving area to the illuminating area by the light directing area.

20. Computer program product as recited in claim 19 wherein the light directing area includes a reflecting surface, the computer program product further comprising:
   computer code for reflecting the transmitted light from the light receiving area towards the illuminating area by the reflecting surface.

21. Computer program product as recited in claim 20 wherein the reflecting surface is disposed internal to the translucent portion.

22. Computer program product as recited in claim 21 wherein the reflecting surface is disposed external to the translucent portion.

23. Computer program product as recited in claim 17 wherein the pair of light emitting diodes are affixed to a printed circuit board that is provided within the housing.

* * * * *